US005593372A

United States Patent [19]
Rodgers, Jr.

[11] Patent Number: 5,593,372
[45] Date of Patent: Jan. 14, 1997

[54] STATIONARY EXERCISE APPARATUS HAVING A PREFERRED FOOT PLATFORM PATH

[75] Inventor: Robert E. Rodgers, Jr., Houston, Tex.

[73] Assignee: CCS, LLC, Denver, Colo.

[21] Appl. No.: 497,612

[22] Filed: Jun. 30, 1995

Related U.S. Application Data

[63] Continuation-in-part of Ser. No. 377,846, Jan. 25, 1995.

[51] Int. Cl.⁶ .......................... A63B 69/16; A63B 22/04
[52] U.S. Cl. ................... 482/52; 482/51; 482/70; 482/57
[58] Field of Search ...................... 482/51, 52, 53, 482/54, 57, 70, 71, 74, 79–80, 92, 62

[56] References Cited

U.S. PATENT DOCUMENTS

| | | |
|---|---|---|
| 219,439 | 9/1879 | Blend . |
| 2,603,486 | 7/1952 | Hughes . |
| 3,316,898 | 5/1967 | Brown . |
| 3,432,164 | 3/1969 | Deeks . |
| 3,759,511 | 9/1973 | Zinkin et al. . |
| 4,053,173 | 10/1977 | Chase, Sr. . |
| 4,188,030 | 2/1980 | Hooper . |
| 4,379,566 | 4/1983 | Titcomb . |
| 4,456,276 | 6/1984 | Bortolin . |
| 4,509,742 | 4/1985 | Cones . |
| 4,555,109 | 11/1985 | Hartmann . |
| 4,561,318 | 12/1985 | Schirrmacher . |
| 4,645,200 | 2/1987 | Hix . |
| 4,679,786 | 7/1987 | Rodgers . |
| 4,720,093 | 1/1988 | Del Mar . |
| 4,869,494 | 9/1989 | Lambert, Sr. . |
| 4,900,013 | 2/1990 | Rodgers, Jr. . |
| 4,949,954 | 8/1990 | Hix . |
| 4,949,993 | 8/1990 | Stark et al. . |
| 4,989,857 | 2/1991 | Kuo . |
| 5,039,087 | 8/1991 | Kuo . |
| 5,039,088 | 8/1991 | Shifferaw . |
| 5,131,895 | 7/1992 | Rogers, Jr. . |
| 5,135,447 | 8/1992 | Robards, Jr. et al. . |
| 5,186,697 | 2/1993 | Rennex . |
| 5,242,343 | 9/1993 | Miller . |
| 5,290,211 | 3/1994 | Stearns . |
| 5,295,928 | 3/1994 | Rennex . |
| 5,299,993 | 4/1994 | Habing . |
| 5,383,829 | 1/1995 | Miller . |
| 5,401,226 | 3/1995 | Stearns . |
| 5,423,729 | 6/1995 | Eschenbach . |

FOREIGN PATENT DOCUMENTS 2919494  5/1979  Germany .

*Primary Examiner*—Stephen R. Crow
*Attorney, Agent, or Firm*—Marc L. Delflache; Pravel, Hewitt, Kimball & Krieger

[57] ABSTRACT

A stationary exercising apparatus which promotes cardiovascular exercise yet minimizes impact on critical joints through the generation of a predetermined elliptical path movement while maintaining foot platforms substantially parallel with the floor. A base structure supports a pair of reciprocating members which are displaced in a horizontal direction parallel with the floor at one end yet reciprocate in circular motion at the other end through a coupling system attached to the frame. A linkage assembly is included which operates in conjunction with the reciprocation of one end of the reciprocating members to maintain the foot platforms substantially parallel with a reference plane while revolving the foot platforms in a substantially elliptical path. The apparatus may include additional linkage to facilitate a corresponding upper body exercise involving movement of the arms along a predetermined arc.

30 Claims, 4 Drawing Sheets

STATIONARY EXERCISE APPARATUS HAVING A PREFERRED FOOT PLATFORM PATH

RELATED APPLICATION

This patent application is a continuation-in-part of U.S. patent application Ser. No. 08/377,846, filed Jan. 25, 1995, pending entitled Stationary Exercise Apparatus.

BACKGROUND OF THE INVENTION

1. Field of the Invention

The present invention relates to an improved stationary exercising apparatus. More particular, the invention relates to an improved exercising apparatus which enables the user to move his feet in an elliptical path while foot platforms remain substantially parallel with a reference plane.

2. Description of the Prior Art

Stair climbing is a popular form of exercise for the cardiovascular system. However, it can over prolonged use overstress the knees. Walking is also a popular form of exercise but it does not load the cardiovascular system to the extent stair climbing does. Therefore, the need exists for an improved stationary exercising device which will load the cardiovascular system as stair climbing does but does not overload or unduly stress the knees and other joints. Prior art stair climbing devices have two common draw backs. First, they require excessive lifting of the knees or an exaggerated vertical movement of the lower legs. See, for example, U.S. Pat. Nos. 3,316,898; 4,949,993; 4,989,857; and 5,135,477. Alternatively, the devices which do tend to promote a more natural movement of the knees and ankles are difficult to ascend and descend because of the configuration of the devices. See, for example, U.S. Pat. No. 5,242,343. Additionally, while certain prior art devices have attempted to imitate a more natural movement of the knees or ankles, they have failed to provide an accurate simulation. See, for example, U.S. Pat. Nos. 5,242,343 and 5,383,829.

In addition, the need exists for a more rhythmic movement of the hand motions in combination with a stair climbing exercise to accelerate the cardiovascular workout and exercise of the upper body muscle groups without unduly overstressing the elbows and shoulders. Hence, the need exists for an improved stationary exercise device which can combine the movements of the feet and hands in a more natural and rhythmic motion.

SUMMARY OF THE INVENTION

Briefly, the invention relates to an improved stationary exercising device. A frame is provided which includes a base portion adapted to be supported by the floor, a mid portion and a top portion. A coupling member is attached to the frame which includes a pulley defining a pivot axis. Two reciprocating members are positioned in spaced relationship to the base portion of the frame. One end of each reciprocating member is adapted for linear movement substantially parallel with the floor. That end of each of the reciprocating member being linearly displaced may contact the base portion or it may slide directly on the floor. The other end of each reciprocating member is attached, directly or indirectly, to the pulley of the coupling member. In this manner, rotation of the pulley rotates one end of each reciprocating member in a circular motion while the other end of each reciprocating member moves in a linear manner. Means are also included for orienting the bottom of the foot of the user through two foot platforms or foot pads so that each foot platform follows a predetermined substantially elliptical path while the foot platforms remain substantially parallel to a reference plane, such as the floor, through their revolution about the ellipse.

Such means for orienting the bottom of the foot may include a duplicate pair of linkage assemblies, one for each foot of the user. Each such linkage assembly may comprise two links. One end of one link pivotally attached proximate the first end of a corresponding reciprocating member. The other end of the first link is in contact with one end of the second link of the linkage assembly. The other end of the second link of that same linkage assembly is pivotally connected to the end of the corresponding reciprocating member to which the first link is proximately attached.

In this manner, during the operation of the present invention, the coupling member serves to rotate one end of the reciprocating member in a circular path while the other end of the reciprocating member moves substantially parallel with the floor, and the coupling member also serves to rotate the end of the second link of each linkage assembly in pivotal connection with the corresponding reciprocating member. This action moves each foot platform in a predetermined substantially elliptical path yet permits the foot platform to remain substantially parallel with a reference plane, such as the floor, during such elliptical movement.

In the preferred embodiment, the first link of each linkage assembly includes a bent portion supported within a telescoping portion. One end of the bent portion is pivotally connected attached to the second end of the second link. This configuration enables the corresponding foot platform or foot pad to remain substantially parallel to a reference plane during the elliptical revolution. The preferred embodiment may include corresponding arm linkage members which are pivotally attached to the telescoping portion of the first link and to the frame assembly permitting the user to exercise the upper body muscles by moving the hands arms through an arcuate path while the foot platforms revolve in a substantially predetermined elliptical path.

In an alternate embodiment of the present invention the first link of each linkage assembly includes a foot portion and an elongated second portion which is in slidable engagement with a roller, or equivalent, mounted on the second end of the second link. This configuration also permits a substantially elliptical path movement of the foot platforms yet permits the foot platforms to remain substantially parallel with a reference plane during their revolution through the elliptical path. Once again, this alternate embodiment may include arm linkage members pivotally attached back to corresponding reciprocating members.

In another alternate embodiment of the present invention, each linkage assembly may comprise two pairs of parallel links. The first pair of parallel links act in a similar fashion to the first link of the preferred embodiment while the second set of parallel links act in a similar fashion to the second link in the preferred embodiment. However, since two parallelograms are established through the use of parallel links connected by a pivot plate between the two pairs of links, the foot platform remains parallel with a reference plane, such as the floor, while moving through a predetermined substantially elliptical path. In addition, one link of the second pair of links of each linkage assembly may be longer and used as an arm member to promote exercise of the upper body muscle group at the same time.

The more important features of this invention have been summarized rather broadly in order that the detailed description may be better understood. There are, of course, additional features of the invention which will be described hereinafter which will also form the subject of the claims appended hereto.

BRIEF DESCRIPTION OF THE DRAWINGS

In order to more fully describe the drawings used in the detailed description of the present invention, a brief description of each drawing is provided.

DETAILED DESCRIPTION OF PREVENT INVENTION

Figure 1:
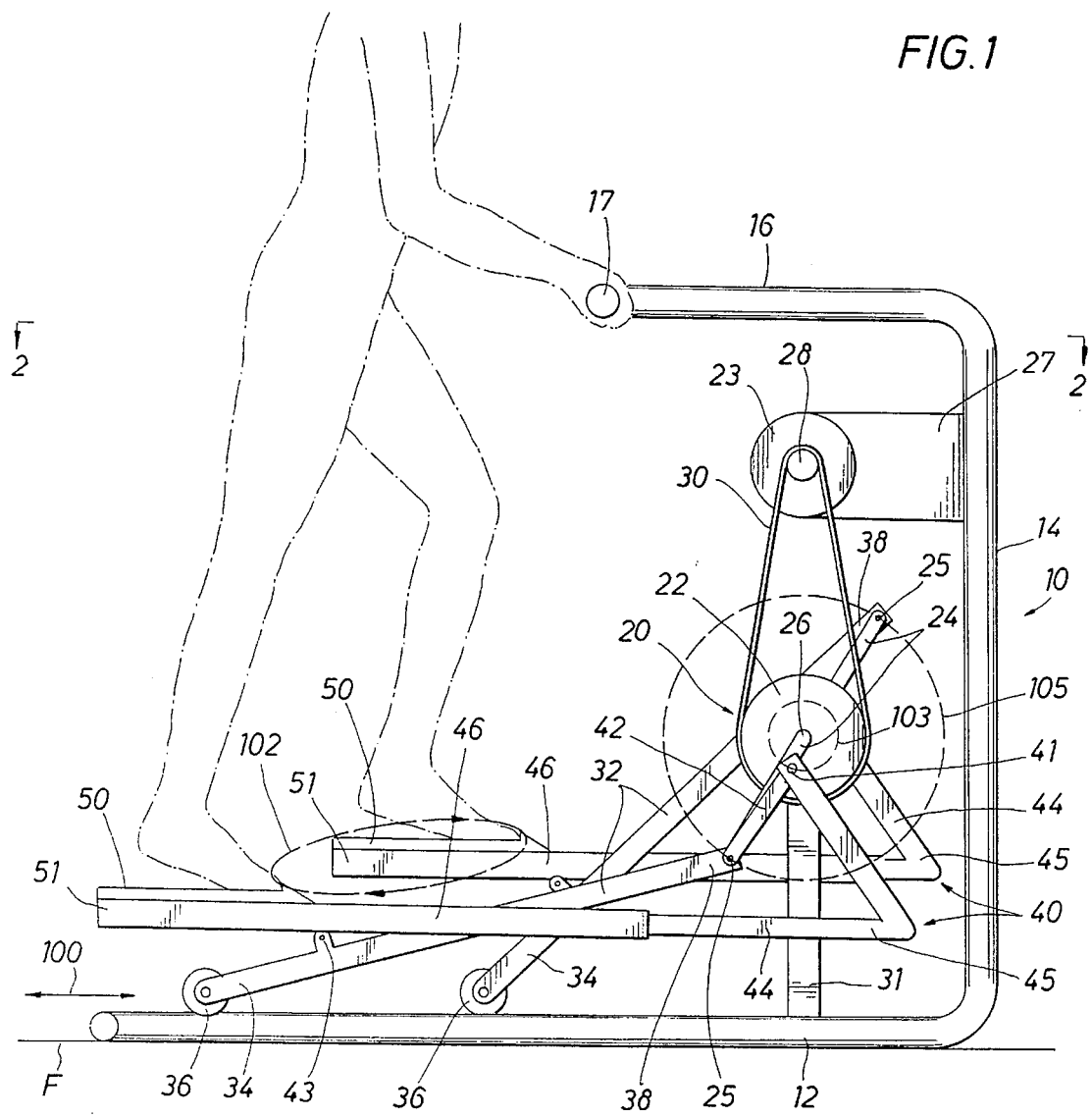
FIG. 1 is an elevation view of the preferred embodiment of the present invention.
Figure 2:
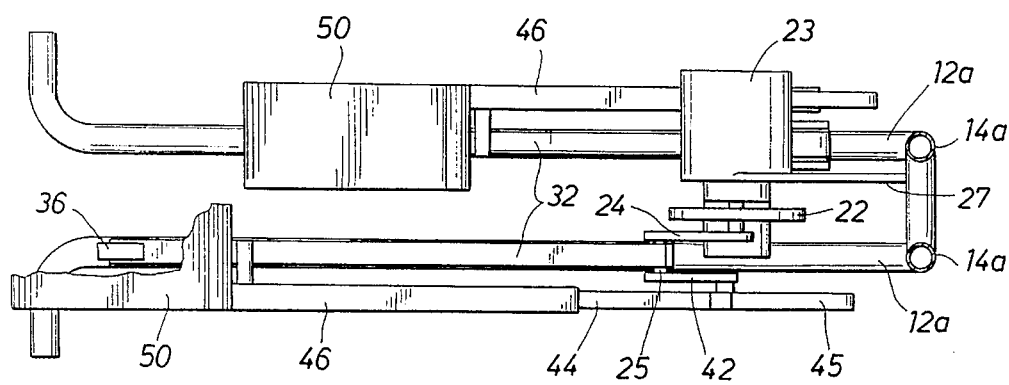
FIG. 2 is a plan view of the preferred embodiment of the present invention.

Referring to FIGS. 1 and 2, a frame 10 is shown comprising a base portion 12, a mid portion 14, and a top portion 16. Referring briefly to FIG. 2, the frame 10 comprises two bottom portions 12a and 12b, two mid portions 14a and 14b, and two top portions (not shown). In essence, the frame is comprised of two separate bents "a" and "b". Obviously, variations can be made to frame 10 as disclosed without departing from the spirit of the invention.

A coupling system 20 is fixed relative to the frame and comprises a pulley 22, crank members 24, resistant brake 23, sheave 28 and belt 30. Two reciprocating members 32 are positioned in the lower proximity of frame 10. Each reciprocating member 32 has one end 34 which is adapted to move laterally in a linear direction as shown in FIG. 1 by arrow 100. A roller 36 is mounted at each end 34 of reciprocating member 32 and is adapted, as shown in FIG. 1, to ride on base portion 12 of frame 10. Alternatively, roller 36 may directly engage the floor, if desirable. The other end 38 of each reciprocating member 32 is pivotally connected to one end of a crank 24. The pivotal connection at end 38 may be through a journal member 25 (see FIG. 2) which extends from the end of crank 24 through an aperture in end 38 of each reciprocating member 32 and attaches to one end of a link 42 of linkage assembly 40 as discussed below. The other end of crank 24 is attached to pulley 22 at pivot axis 26 of coupling system 20. Pulley 22 revolves about axis 26. The preferred embodiment may include a handle portion 17 which is an integral part of top portion 16 of frame 10.

In the preferred embodiment, the present invention includes duplicate linkage assemblies 40. Each linkage assembly 40 comprises two primary links 42 and 44. Link 42 is fixed at one end to journal member 25 and is pivotally connected at its other end 41 to link 44. Link 44 comprises two portions—a bent portion 45 and a telescoping portion 46. One end of bent portion 45 reciprocates within telescoping portion 46. A foot platform or foot pad 50 is attached to telescoping portion 46 of link 44 proximate end 51 of link 44.

Figure 3:
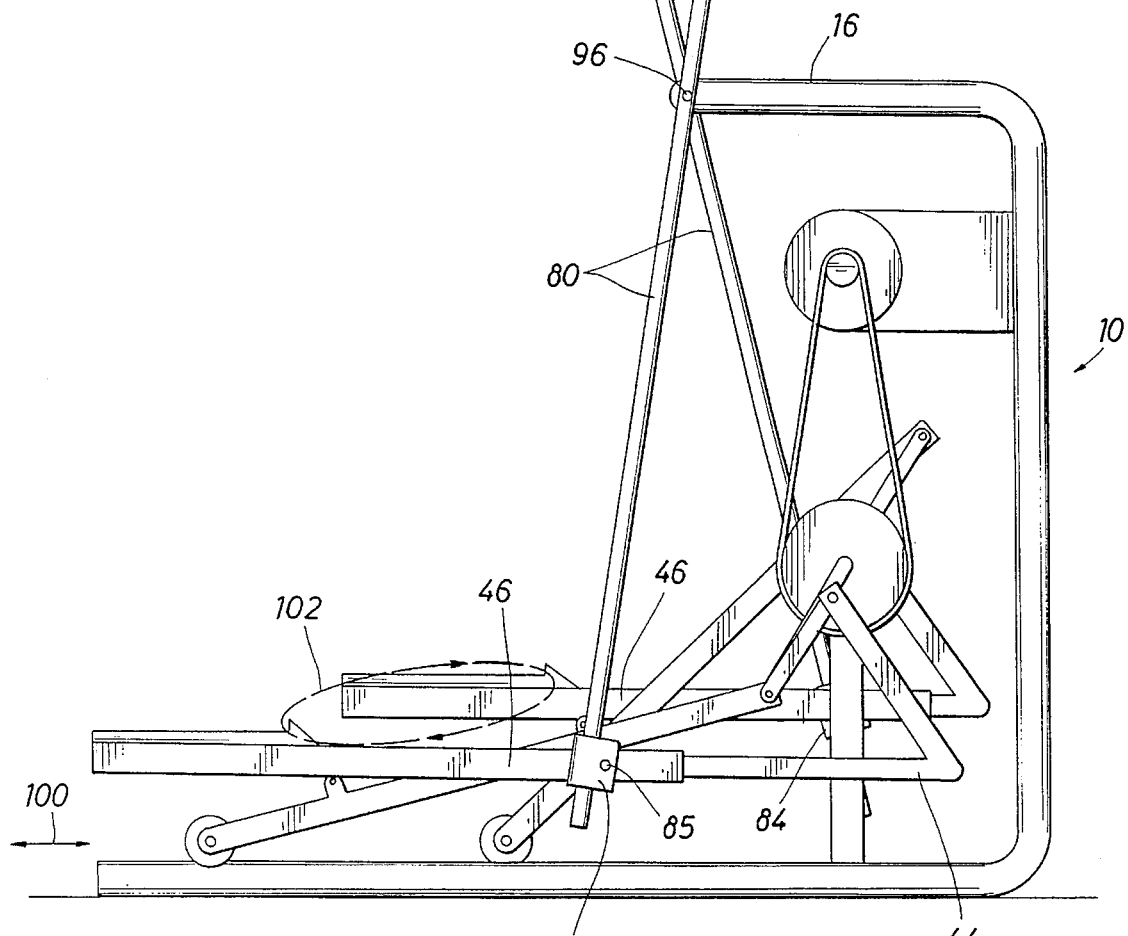
FIG. 3 is an elevation view of the preferred embodiment of the present invention having arm members.

Referring to FIG. 3, the preferred embodiment shown in FIG. 1 is reproduced but includes arm members 80. Each arm member includes a handle portion 82 which is gripped by the user during the operation of the apparatus. The other end of each arm member 80 reciprocates within a sleeve 84. Sleeve 84 is pivotally attached to telescoping portion 46 through pivot point 85. Each arm member 80 is pivotally connected at pivot point 96 to the top portion 16 of frame 10. During operation of the apparatus, arm member 80 pivots about point 96 and thereby slides vertically relative to sleeve 84 as link 44 revolves in accordance with the present invention as described below.

In the operation of the preferred embodiment as shown in FIGS. 1–3, the user "U" ascends the present invention from the back or the sides which facilitate its use. In some prior art disclosures, ascending and descending is difficult and cumbersome due to the location of the pulleys and of the structure. However, in the case of the present invention it is easy to ascend and descend as there is a minimal amount of interference in the structure during exercise activity.

During operation, a climbing motion by the user results in the displacement of first ends 34 of each reciprocating member 32 in the direction of arrow 100. Similarly, a circular motion occurs at the second end 38 of each reciprocating member 32 as shown in phantom by circle 105. At points between the ends 34 and 38 of each reciprocating member 32, the motion gradually changes from a circular motion (at ends 38) to a linear motion at ends 34. This geometric transition occurs in the form of an approximate ellipse. It is not a perfect elliptical shape; it tends to be slightly more egg-shaped. However, it provides a more natural and rhythmic body movement.

Figure 4:
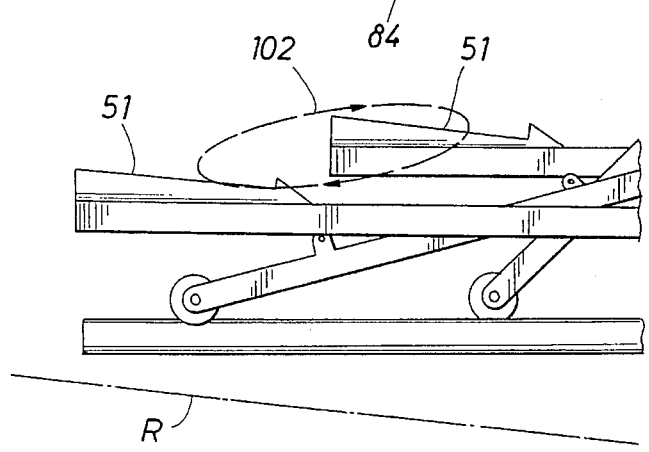
FIG. 4 is a detail view of a portion of the present invention.

Additionally, the circular movement of journal member 25 results in a similar circular motion of the outer end of links 42 since each crank 24 and link 42 are fixed relative to one another through journal member 25. This causes pivot connection 41 to rotate in a circle about axis 26 as shown in phantom as circle 103. Thus, two concurrently circular motions occur as shown by circles 103 and 105. Such dual circular motion translates to a substantially elliptical shape as shown by ellipse 102 at foot platforms 50 yet permits each foot platform 50 to remain substantially parallel with a reference plane, which in the case of FIG. 1 is shown as the floor "F" or base portion 12, during such elliptical movement of foot platform 50. Obviously, foot platform 50 may be initially oriented at an angle relative to a reference plane other than the floor by bending the end of portion 46 or including a wedge under each platform 50. In either event, the present invention still provides that the foot platforms 51 remains substantially parallel to a reference plane "R" as shown in FIG. 4.

Referring to FIG. 3, while the user displaces the foot platforms in a substantially elliptical shape, the arms are used to oscillate handle portions 82 in an arcuate path as shown by arrow 104. The arc of arrow 104 is defined by the radius of a circle extending from pivot point 96 to handle portions 82.

Referring still to FIGS. 1–3, resistant brake 23 of coupling system 20 operates in a manner well-known to those skilled in the art. Resistant brake 23 serves to increase or decrease the load on the pulley through the sheave point 28/belt 30 arrangement. Coupling system 20 is secured to base portion 12 of frame 10 through plate 31. Similarly, resistant brake 23 is secured to mid portion 14 of frame 10 through bracket 27.

Figure 5:
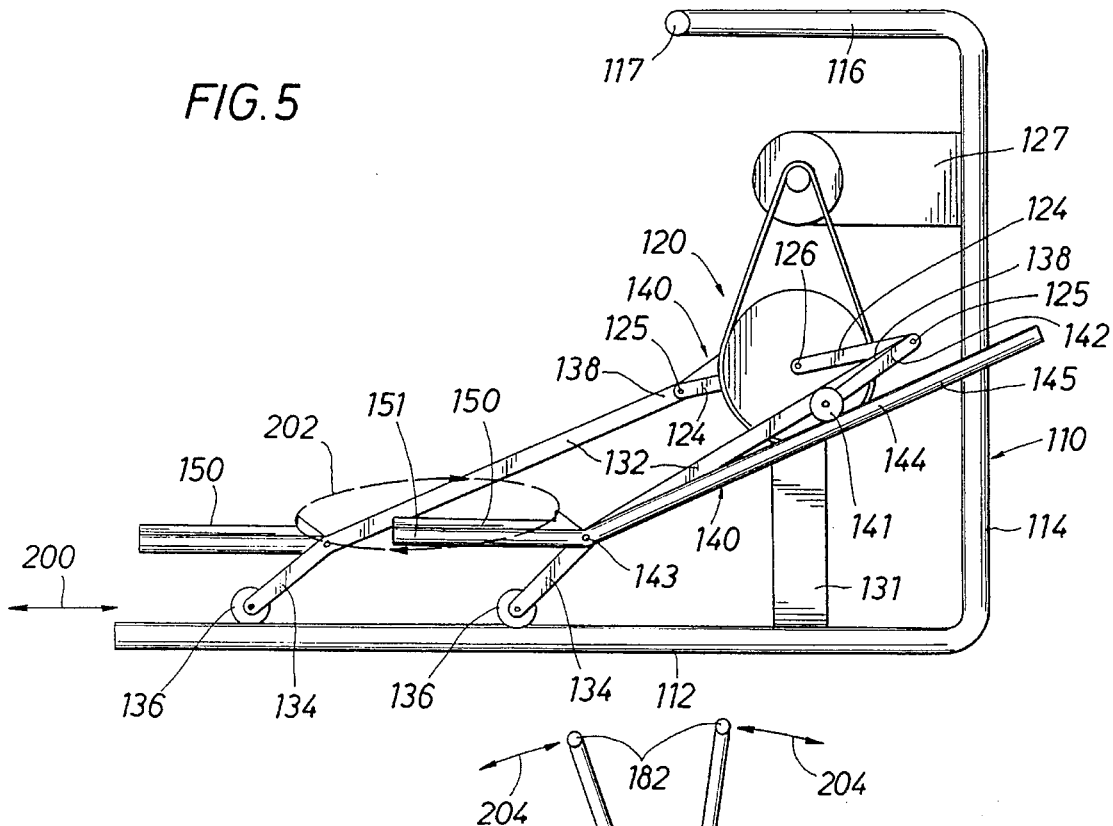
FIG. 5 is an elevation view of an alternate embodiment of the present invention.
Figure 6:
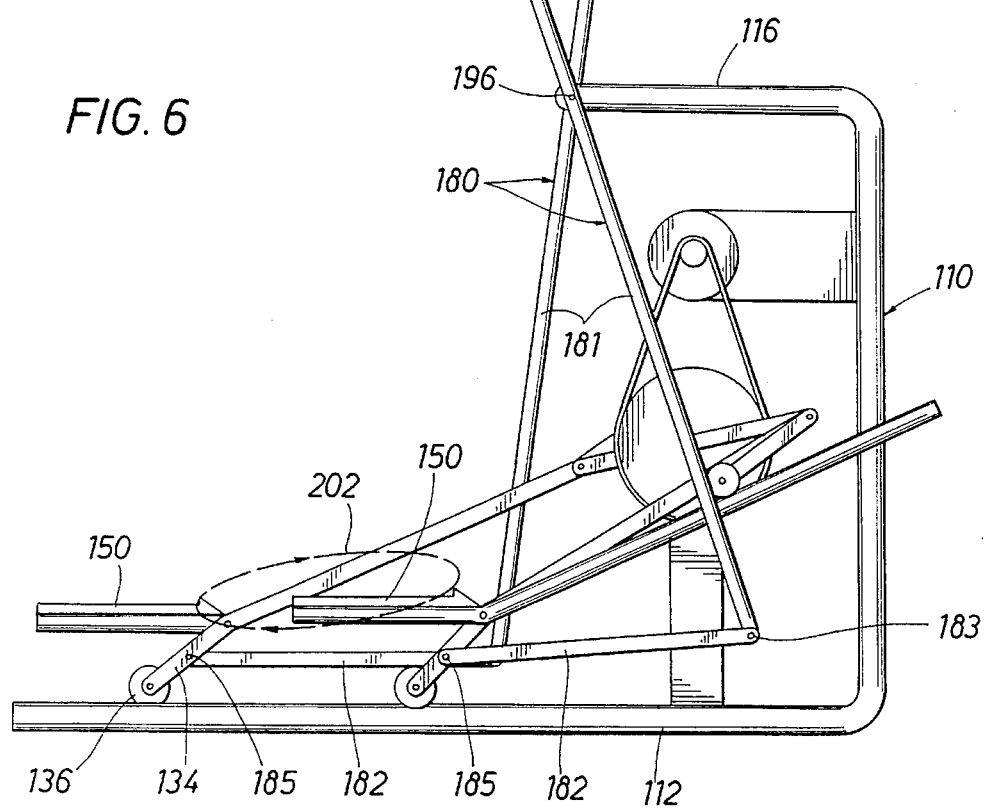
FIG. 6 is an elevation view of the alternate embodiment of the present invention shown in FIG. 4 having arm members.

Referring to FIGS. 5 and 6, an alternate embodiment of the present invention is shown. When possible, identical two-digit reference numerals will be used to designate similar structure found in the preferred embodiment but with a 100 series prefix. Frame 110 comprises a base portion 112, a mid portion 114, and a top portion 116. A coupling system 120 is included having identical components of the coupling system 20 described above for the preferred embodiment. Furthermore, coupling system 120 performs in an identical manner to coupling system 20 described above for the preferred embodiment.

A pair of reciprocating members 132 are also included, each having a first end 134 on which rollers 136 are mounted. The second end 138 of each reciprocating member 132 is pivotally connected via a journal member 125 to one end of each crank 124. Again, two linkage assemblies 140 are included, each having a first link 142 and a second link 144. Each link 144 supports a foot platform 150 over end 151. Additionally, each link 144 is pivotally connected, preferably in front of foot platform 150 to a reciprocating member 132 proximal end 134 at connection 143.

Link 142 is fixed at one end to journal member 125. Thus, each link 142 is fixed relative to corresponding crank member 124. The other end of each link 142 includes a roller 141 which engages portion 145 of link 144. As in the case of the preferred embodiment, a handle portion 117 is available to be gripped by the user.

Referring to FIG. 6, the alternate embodiment previously shown in FIG. 5 is depicted with arm members 180. Each arm member 180 includes two links 181 and 182. Link 181 is pivotally connected at pivot connection 196 to top portion 116 of frame 110. The other end of each link 181 is pivotally connected at connection 183 to one end of link 182. The other end of link 182 is pivotally connected at pivot point 185 to end 134 of a reciprocating member 132. Each link 181 includes a handle portion 182 which the operator grips during operation of the apparatus.

In the operation of the alternate embodiment as shown in FIGS. 5 and 6, the user ascends the device from the side or the rear with ease, places both feet on foot platforms 150, grabs handle portion 117 and begins a climbing motion. At that point, first end 134 of each reciprocating member 132 is displaced in a linear manner in the direction of arrow 200. Similarly, as in the case of the preferred embodiment, end 138 of each reciprocating member 132 moves in a circular motion about axis 126 as shown in phantom by circle 105 (see FIG. 1). Again, the change from a linear movement at ends 134 of reciprocating members 132 to a circular movement at ends 138 of reciprocating member 132 is an approximate ellipse of varying shape depending on its location along the length of reciprocating member 132. As in the case of the preferred embodiment, as journal member 125 revolves in a circular path as shown by circle 105 (FIG. 1) about axis 126, roller 141 revolves in a circular path about axis 126 as shown in phantom line by circle 103 (see FIG. 1). This serves to provide for a substantially elliptical path for foot platform 150 yet provides that platform 150 will remain substantially parallel with the floor "F" or other reference plane as described above with respect to FIGS. 1 and 4.

Referring now to the operation of the alternate embodiment including arm members as shown in FIG. 6, the operation of the hands through arcuate path 204 is facilitated by the reciprocating motion of rollers 136 along base portion 112. Such lateral movement in the direction of arrow 200 (see FIG. 4) serves to laterally displace pivot connection 185 which, through links 181 and 182, oscillates handle portion 182 in an arcuate path 204. The radius of arcuate path 204 is determined by the distance from the handles to pivot connection 196 which defines the radius of the circle of the arcuate path 204.

Figure 7:
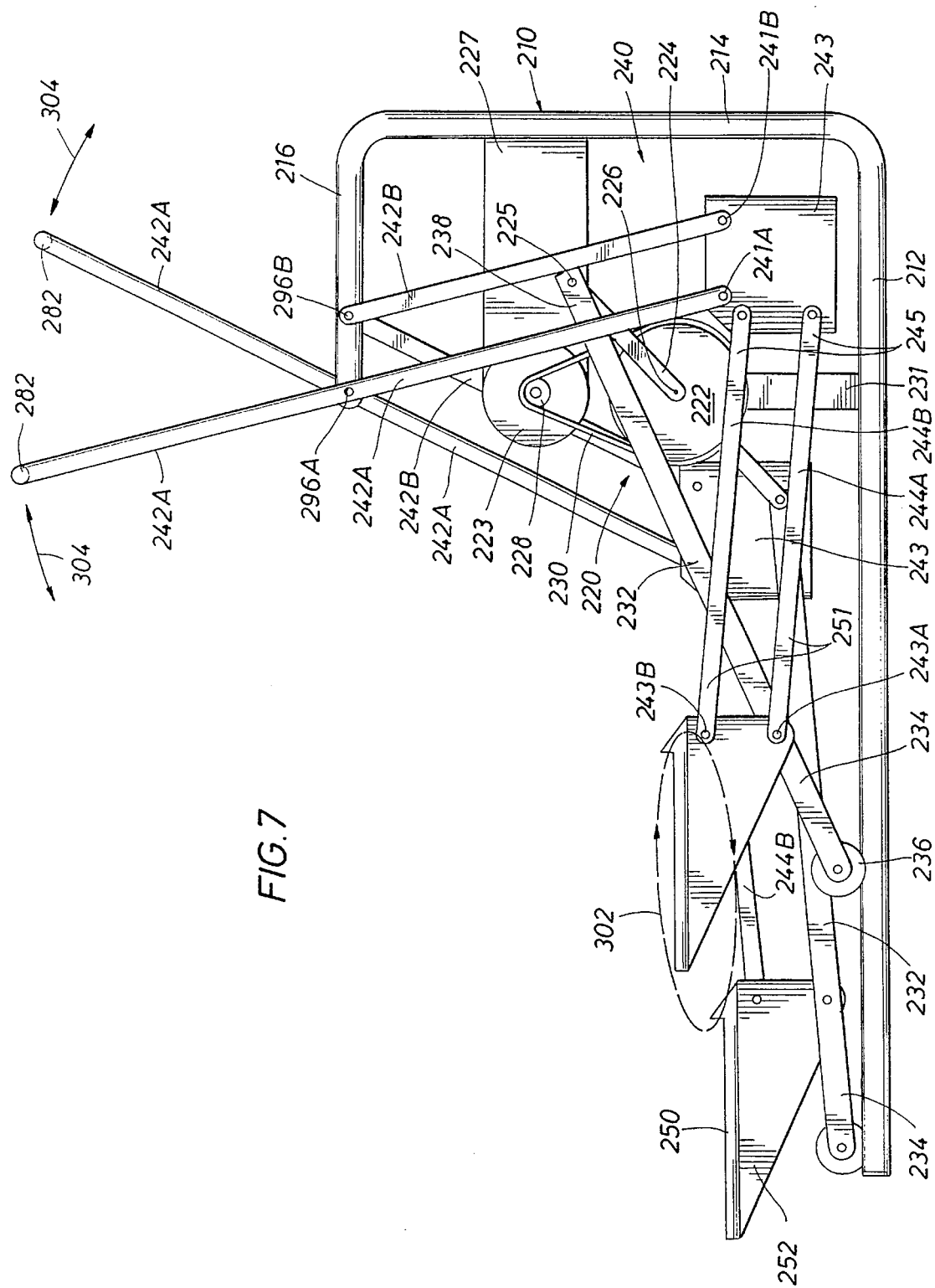
FIG. 7 is an elevation view of yet another alternate embodiment of the present invention.

Referring to FIG. 7, another alternate embodiment is shown. As in the case of the previous embodiments, similar structure will be referred to with the same two-digit reference numeral when possible but with a 200 series prefix.

Frame 210 comprises a base portion 212, a mid portion 214 and a top portion 216. A coupler system 220 is shown which includes the same components and functions identical with the coupling system 20 of the preferred embodiment. Two reciprocating members 232 are included, each having a first end 234 to which a roller 236 is attached. The other end 238 of each reciprocating member 232 is pivotally connected to one end of a crank 224 of coupling system 220. As in the case of the previous embodiments, this alternate embodiment includes two identical link assemblies 240. Each link assembly 240 includes two pairs of links 242A/B and 244A/B. As shown, link 242A is pivotally mounted parallel with link 242B, and link 244A is pivotally mounted parallel to link 244B. A foot platform pedal structure 252 is pivotally attached to ends 251 of links 244A/B at pivot connections 243A/B. Foot platform pedal 242 is also pivotally attached to end 234 of reciprocating member 232 through pivoted connection 243A. Links 244A/B are pivotally connected at ends 245 to a pivot plate 243. Links 244A/B are pivotally connected at one end through pivot connections 241A/B to pivot plate 243. The other end of link 242B is pivotally connected at pivot point 296B to top portion 216 of frame 210. Link 242A is pivotally connected through pivot connection 296A to the top portion 216 of frame 210 as well. However, the connection at 296A is not the upper end of link 296A. Rather, as shown, link 242A extends upwardly therefrom and includes a handle portion 282 at its opposite end which is used by the operator. Each foot platform pedal 252 includes a foot platform 250 on which the user places his foot during operation of the apparatus.

As in the case of the previous embodiments, this alternate embodiment includes a resistant brake 223 which serves to increase or decrease the load on the pulley 222 of coupling system 220 through the sheave 228/belt 230 arrangement. Resistant brake 223 in combination with the sheave 228/belt 230 arrangement operates in the identical manner to resistant brake 23 and sheave 28/belt 30 of the preferred embodiment as discussed above. As shown, coupling system 220 is mounted to base portion 212 by a plate 231. Similarly, resistant brake 223 is mounted to mid portion 214 of frame 220 by a plate 227.

In the operation of this alternate embodiment, the user ascends the device from the side or the rear and begins the climbing motion using foot platforms 250. The user also grabs handle portions 282 and begins an oscillating motion. Since each link 242A is pivotally connected at connection 296A, the handle portions define an arcuate path as shown by arrow 304. During the climbing motion, foot platforms 250 define a substantially elliptical path as shown by path 302. In the operation of this embodiment, the movement of linkage assemblies 240 maintains foot platform 250 substantially parallel with the floor or other reference plane at all times while the foot platform revolves through elliptical path 302. As in the case of the preferred embodiment and as shown in FIGS. 1 and 4 and discussed above, the shape of each pedal 252 may be selected to orient each platform 250 and an acute angle relative to the floor but parallel to one another and a reference plane "R". Thus, in the operation of this embodiment, as each platform revolves in a substantially elliptical path but each such platform 250 remains substantially parallel to a reference plane as it revolves through path 302.

Each linkage assembly 240 comprises two parallelograms, the first defined by parallel links 242A/B, top portion 216 between connections 296A/B, and the pivot plate 243 between pivot connections 241A/B. The second parallelogram is defined by links 244A/B, foot platform pedal 252 and pivot plate 243. As in the case of the previous embodiments, the climbing motion which the operator imposes on platforms 250 serves to revolve point 225 in a circular path about axis 226. Linkage assemblies 240 serve to ensure that foot platforms 250 remain substantially parallel with the floor or a reference plane as it revolves in the predetermined substantially elliptical path 302.

An improved stationary exercising device is disclosed in the foregoing preferred and alternate embodiments which maximizes cardiovascular exercise yet minimizes stress on critical joints through the use of linkages which define a predetermined substantially elliptical path that more accurately simulates natural and rhythmic body movement coupled with movement of a foot platform which remains substantially parallel with the floor. Keeping the foot platform substantially parallel with a reference plane, such as the floor, is beneficial since users would anticipate that the step or platform surface will remain at the same angular orientation during its revolution through the substantially elliptical path.

Obviously, modifications and alterations of the embodiments disclosed herein will be apparent to those skilled in the art in view of this disclosure. It is intended that all such variations and modifications fall within the spirit and scope of this invention as claimed.

What is claimed is:

1. An apparatus for exercising comprising:

a frame having a base portion adapted to be supported by a floor;

first and second reciprocating members, each reciprocating member having a first end and a second end, said first end of said first and second reciprocating members adapted for linear motion substantially parallel with the floor;

a coupling member having (i) a pulley supported by said frame defining a pivot axis, and (ii) means for attaching said second ends of said first and second reciprocating members to said pulley so that rotation of said pulley results in the rotation of said second ends of said first and second reciprocating members in a substantially circular path about said pivot axis; and means for orienting the bottom of the foot of the user of the apparatus, said orienting means including first and second foot platforms so that during operation of the apparatus each said foot platform remains substantially parallel with a predetermined reference plane while revolving in a predetermined substantially elliptical path.

2. The exercising apparatus according to claim 1 wherein said frame further comprises a top portion adapted to provide hand support for the user of the apparatus.

3. The exercising apparatus according to claim 1 wherein said coupler member attaching means comprises:

a first element attached at one end to said pulley proximate said pivot axis and at its other end to said second end of said first reciprocating member; and a second element attached at one end to said pulley proximate said pivot axis and at its other end to said second end of said second reciprocating member.

4. The exercising apparatus according to claim 1 wherein each reciprocating member includes means for enabling said first ends of said reciprocating members to contact said base portion.

5. The exercising apparatus according to claim 1 wherein each said reciprocating member includes means for enabling said first ends of said reciprocating members to contact the floor.

6. The exercising apparatus according to claim 1 wherein said reference plane is the floor supporting said frame.

7. The exercise apparatus according to claim 1 wherein said apparatus further comprises means for linking arcuate motion of the hands of the user with the revolution of said foot platforms in said predetermined substantially elliptical path.

8. The exercise apparatus according to claim 1 wherein said orienting means comprises:

a first linkage assembly having a first pair of links, a second pair of links, and a pivot plate, said first pair of links having first and second ends, said first end of at least one of said first pair of links pivotally attached between said first and second ends of said first reciprocating member proximate said first end of said first reciprocating member and said first ends of said first pair of links pivotally attached to said first foot platform and said second ends of said first pair of links pivotally attached to said pivot plate, said second pair of links having first and second ends, said first ends of said second pair of links pivotally attached to said pivot plate and at least one of said second pair of links pivotally attached to said frame; and a second linkage assembly having a first pair of links, a second pair of links, and a pivot plate, said first pair of links of said second linkage assembly having first and second ends, said first end of at least one of said first pair of links of said second linkage assembly pivotally attached between said first and second ends of said second reciprocating member proximate said first end of said second reciprocating member, said first ends of said first pair of links of said second linkage assembly pivotally attached to said second foot platform, and said second ends of said first pair of links of said second linkage assembly pivotally attached to said pivot plate of said second linkage assembly, said second pair of links of said second linkage assembly having first and second ends, said first ends of said second pair of links of said second linkage assembly pivotally attached to said pivot plate of said second linkage assembly and at least one of said second pair of links of said second linkage assembly pivotally attached to said frame, said second end of one of said second pair of links of said first linkage assembly and said second end of one of said second pair of links of said second linkage assembly having a handle portion so that the user of said apparatus may grip said handle portions during use of the apparatus enabling a substantially arcuate movement of said handle portions.

9. An apparatus for exercising comprising:

a frame having a base portion adapted to be supported by a floor;

first and second reciprocating members, each reciprocating member having a first end and a second end, said first end of said first and second reciprocating members adapted for linear motion substantially parallel with the floor;

a coupling member having (i) a pulley supported by said frame defining a pivot axis, and (ii) means for pivotally attaching said second ends of said first and second reciprocating members to said pulley so that rotation of said pulley results in rotation of said second ends of said first and second reciprocating members in a substantially circular path about said axis; and first and second linkage assemblies, said first linkage assembly pivotally connected proximate a first end between the first and second ends of said first reciprocating member proximate said first end of said first reciprocating member and said first linkage assembly having a second end attached to said coupling member attaching means at said first reciprocating member, said second linkage assembly pivotally connected proximate a first end between the first and second ends of said second reciprocating member proximate said first end of said second reciprocating member and said second linkage assembly having a second end attached to said coupling member attaching means at said second reciprocating member, said first linkage assembly having a foot platform proximate said first end of said first linkage assembly and said second linkage assembly having a foot platform proximate said first end of said second linkage assembly, wherein during use of the apparatus said foot platforms remain substantially parallel with a predetermined reference plane while revolving in a predetermined substantially elliptical path.

10. The exercise apparatus according to claim 9 wherein said apparatus further comprises means for linking arcuate motion of the hands of the user with the revolution of said foot platforms in said predetermined substantially elliptical path.

11. The exercise apparatus according to claim 9 wherein said reference plane is the floor supporting said frame.

12. An exercising apparatus comprising:

a frame having a base portion adapted to be supported by a floor;

a first linkage assembly having:
  (i) a reciprocating member,
  (ii) a foot member assembly, and
  (iii) an arm member assembly, said reciprocating member having a first end and a second end, said first end of said reciprocating member being adapted for linear movement substantially parallel with the floor;

a second linkage assembly having:
  (i) a reciprocating member,
  (ii) a foot member assembly, and
  (iii) an arm member assembly, said reciprocating member of said second linkage assembly having a first end and a second end, said first end of said second linkage assembly reciprocating member being adapted for linear movement substantially parallel with the floor; and a coupling member having:
  (i) a pulley Supported by said frame defining a pivot axis; and
  (ii) means for pivotally attaching said second ends of said reciprocating members to said pulley so that rotation of said pulley results in the rotation of said second ends of said reciprocating members in a substantially circular path about said axis, said first linkage assembly foot member assembly comprising a first foot link and a second foot link, said first foot link having first and second ends and said first foot link pivotally connected proximate said first end of said first linkage assembly reciprocating member and proximate said first end of said first foot link, said second foot link having first and second ends, said first end of said second foot link attached to said coupler member attaching means at said second end of said first linkage assembly reciprocating member and said second end of said second foot link engaging said first foot link proximate said second end of said first foot link, said first linkage assembly foot member assembly includes a foot platform proximate said first end of said first foot link, said second linkage assembly foot member assembly comprising a first foot link and a second foot link, said first foot link of said second foot member assembly having first and second ends, said first foot link of said second foot member assembly being pivotally connected to said second linkage assembly reciprocating member proximate said first end of said second linkage assembly reciprocating member and proximate said first end of said first foot link of said second linkage assembly foot member assembly, said second foot link of said second linkage assembly foot member assembly having first and second ends, said first end of said second foot link of said second linkage assembly foot member assembly attached to said coupling member attaching means at second end of said second linkage assembly reciprocating member and said second end of said second foot link of said second linkage assembly foot member assembly engaging said first foot link of said second linkage assembly foot member assembly proximate said second end of said first foot link of said second linkage assembly foot member assembly, said first foot link of said second linkage assembly foot member assembly includes a foot platform proximate said first end of said first foot link of said second linkage assembly foot member assembly, wherein upon operation of the apparatus, said foot platform of said first linkage assembly foot member assembly and said foot platform of said second linkage assembly foot member assembly remain substantially parallel with a predetermined reference plane while revolving in a predetermined substantially elliptical path.

13. The exercising apparatus according to claim 12 wherein said second foot link of said first and second linkage assemblies foot member assembly include a roller mounted at the second end of said second foot links to slidably engage said first foot links of said first and second linkage assemblies foot member assembly proximate said second end of said first foot links.

14. The exercising apparatus according to claim 12 wherein each said arm member assembly of said first and second linkage assemblies comprise first and second arm members pivotally interconnected and pivotally attached at one end to a reciprocating member proximate the first end of said reciprocating member and pivotally attached at the other end of said pivotally interconnected first and second arm members to said frame.

15. The exercising apparatus according to claim 12 wherein said coupler member attaching means comprises:

a first element attached at one end to said pulley proximate said pivot axis and at its other end to said second end of said first linkage assembly reciprocating member; and a second element attached at one end to said pulley proximate said pivot axis and at its other end to said second end of said second linkage assembly reciprocating member.

16. The exercising apparatus according to claim 12 wherein each reciprocating member includes means for enabling said first ends of said reciprocating members to contact said base portion.

17. The exercising apparatus according to claim 12 wherein each said reciprocating member includes means for enabling said first ends of said reciprocating members to contact the floor.

18. The exercising apparatus according to claim 12 wherein said reference plane is the floor supporting said frame.

19. An exercising apparatus comprising:

a frame having a base portion adapted to be supported by a floor;

a first linkage assembly having a reciprocating member and a foot link, said reciprocating member having first and second ends, said first end of said reciprocating member adapted for linear movement substantially parallel with the floor, said foot link having first and second ends, said foot link pivotally attached proximate said end of said foot link between said first and second ends of said reciprocating member proximate said first end of said reciprocating member;

a second linkage assembly having a reciprocating member and a foot link, said reciprocating member of said second linkage assembly having first and second ends, said first end of said second linkage assembly reciprocating member adapted for linear movement substantially parallel with the floor, said foot link of said second linkage assembly having first and second ends, said foot link of said second linkage assembly pivotally attached between said first and second ends of said reciprocating member of said second linkage assembly proximate said first end of said reciprocating member of said second linkage assembly; and a coupling member having (i) a pulley supported by said frame defining a pivot axis, and (ii) means for attaching said second ends of said reciprocating members to said pulley and said second ends of said foot links so that rotation of said pulley results in rotation of said second ends of said reciprocating members in a first circular path about said axis and in rotation of said second ends of said foot links in a second circular path about said axis while said foot platforms remain substantially parallel with a predetermined reference plane and revolves in a predetermined substantially elliptical path.

20. The exercising apparatus according to claim 19 wherein said coupler member attaching means comprises:

a first element attached at one end to said pulley proximate said pivot axis and at its other end to said second end of said reciprocating member of said first linkage assembly; and a second element attached at one end to said pulley proximate said pivot axis and at its other end to said second end of said reciprocating member of said second linkage assembly.

21. The exercising apparatus according to claim 19 wherein said frame further comprises a top portion adapted to provide hand support for the user of the apparatus.

22. The exercising apparatus according to claim 19 wherein each reciprocating member includes means for enabling said first ends of said reciprocating members to contact said base portion.

23. The exercise apparatus according to claim 19 wherein said reference plane is the floor supporting said frame.

24. The exercising apparatus according to claim 19 wherein said second foot links of said first and second linkage assemblies include a roller mounted at said second end of said second foot links of said first and second linkage assemblies to slidably engage said second end of said first foot link of said first and second linkage assemblies.

25. An apparatus for exercising comprising:

a frame having a base portion adapted to be supported by a floor;

first and second reciprocating members, each reciprocating member having first and second ends, said first ends of said first and second reciprocating members adapted for linear motion substantially parallel with the floor;

a coupling member having (i) a pulley supported by said frame defining a pivot axis, and (ii) means for pivotally attaching said second ends of said first and second reciprocating members to said pulley so that rotation of said pulley results in the rotation of said second ends of said first and second reciprocating members in a substantially circular path about said pivot axis;

a first linkage assembly having a first link and a second link, said first link having first and second ends, said first link pivotally attached between said first and second ends of said first reciprocating member proximate said first end of said first reciprocating member and proximate said first end of said first link, said first link including a foot platform proximate said first end of said first link and said first link including a bent portion distally from said foot platform, said second link having first and second ends, said first end of said second link attached to said coupler member attaching means at said second end of said first reciprocating member and said second end of said second link pivotally attached to said second end of said first link;

a second linkage assembly having a first link and a second link, said first link of said second linkage assembly having first and second ends, said first link of said second linkage assembly pivotally attached between said first and second ends of said second reciprocating member proximate said first end of said second reciprocating member and proximate said first end of said first link of said second linkage assembly, said first link of said second linkage assembly including a foot platform proximate said first end of said first link of said second linkage assembly and said first link of said second linkage assembly including a bent portion distally from its foot platform, said second link of said second linkage assembly having first and second ends, said first end of said second link of said second linkage assembly attached to said coupler member attaching means at said second end of said second reciprocating member and said second end of said second link of said second linkage assembly pivotally attached to said second end of said first link of said second linkage assembly, wherein during operation of the apparatus each said foot platform remains substantially parallel with a predetermined reference plane while revolving in a predetermined substantially elliptical path.

26. The exercising apparatus according to claim 25 wherein said first links of said first and second linkage assemblies include a telescoping portion.

27. The exercising apparatus according to claim 25 wherein said coupler member attaching means comprises:

a first element attached at one end to said pulley proximate said pivot axis and at its other end to said second end of said first reciprocating member; and a second element attached at one end to said pulley proximate said pivot axis and at its other end to said second end of said second reciprocating member.

28. The exercise apparatus according to claim 25 wherein said apparatus further comprises means for linking arcuate motion of the hands of the user with the revolution of said foot platforms in said predetermined substantially elliptical path.

29. The exercise apparatus according to claim 25 wherein said reference plane is the floor supporting said frame.

30. An apparatus for exercising comprising:

a frame having a base portion adapted to be supported by a floor;

first and second reciprocating members, each reciprocating member having a first end and a second end, said first end of said first and second reciprocating members adapted for linear motion substantially parallel with the floor;

a coupling member having (i) a pulley supported by said frame defining a pivot axis, and (ii) means for attaching said second ends of said first and second reciprocating members to said pulley so that rotation of said pulley results in the rotation of said second ends of said first and second reciprocating members in a substantially circular path about said pivot axis; and first and second linkage assemblies for orienting the bottom of the foot of the user of the apparatus, said first linkage assembly pivotally connected to said first reciprocating member and said frame and including a foot platform and said second linkage assembly pivotally connected to said second reciprocating member and said frame and including a foot platform so that during operation of the apparatus each said foot platforms remain substantially parallel with a predetermined reference plane while revolving in a predetermined substantially elliptical path.

\* \* \* \* \*